UNITED STATES PATENT OFFICE.

FRITZ HOFMANN, OF ELBERFELD, GERMANY, ASSIGNOR TO THE FARBEN-FABRIKEN OF ELBERFELD COMPANY, OF NEW YORK.

PROCESS OF MAKING CARBONATES OF AROMATIC SERIES.

SPECIFICATION forming part of Letters Patent No. 636,384, dated November 7, 1899.

Application filed December 3, 1898. Serial No. 698,185. (No specimens.)

*To all whom it may concern:*

Be it known that I, FRITZ HOFMANN, doctor of philosophy, chemist, of Elberfeld, Germany, (assignor to the FARBENFABRIKEN OF ELBERFELD COMPANY, of New York,) have invented a new and useful Improvement in the Production of Carbonates of the Aromatic Series; and I hereby declare the following to be a clear and exact description of my invention.

It is known that the carbonates of aromatic phenols, such as phenol, cresol, guaïacol, guaethol, creosol or the like are obtained by the action of phosgene ($COCl_2$) on the said phenols.

I have now discovered a new valuable process for the production of such carbonates. This process consists in the action of certain new chlorinated derivatives of pyridin and its homologues on aromatic phenols profitably in the presence of suitable solvents or diluents.

The said chlorinated derivatives which I briefly term as "chlorocarbonyls" are obtained if for instance perchlormethylformiate of the formula

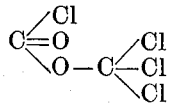

is allowed to act on pyridin or its homologues.

In order to illustrate the production of the said "chlorocarbonyls" which are the starting materials in my new process for the production of aromatic carbonates I give the following example, the parts being by weight: To a solution of three hundred and sixteen parts of pure pyridin, dissolved in one thousand parts of dry benzene a solution prepared from one hundred and ninety-eight parts of perchlormethylformiate and five hundred parts of benzene is added with stirring and keeping the reaction mixture cool. A lemon-yellow precipitate separates immediately which is quickly filtered off and dried *in vacuo*. It is the new chlorocarbonyl derivative from pyridin. According to analytical researches it has the formula:

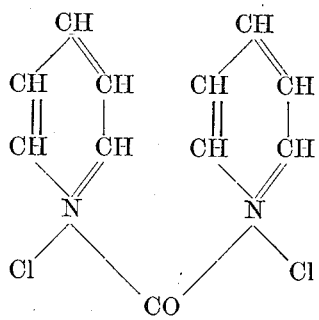

The same body is obtained, if instead of perchlormethylformiate hexachlordimethylcarbonate having the formula

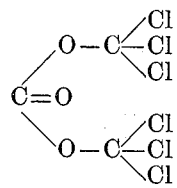

or if phosgene is allowed to act on pyridin.

In an analogous manner the "chlorocarbonyls" of the homologues of pyridin, such as picolin, lutidin or the like are obtained which are likewise yellow powders.

It may be remarked that all these new bodies are very hygroscopic.

In carrying out practically my new process for the production of aromatic carbonates I can proceed as follows, the parts being by weight: To a mixture prepared from 2.57 parts of chlorocarbonyl pyridin and ten parts of dry benzene a solution of 2.48 parts of guaïacol in ten parts of benzene is added with stirring and carefully cooling.

When the yellow color of the chlorocarbonyl compound has disappeared the reaction is finished. If this stage is reached the mixture is washed first with water and then with very dilute hydrochloric acid. Subsequently the benzene is distilled off by means of steam. Thus an oil is obtained which quickly changes into a crystalline mass. On recrystallizing this mass from alcohol the pure carbonic acid ether (carbonate) of guaïacol having the formula

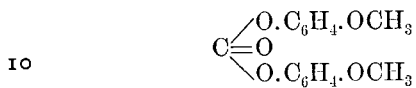

is obtained.

The same product results, if instead of the chlorocarbonyl pyridin the chlorocarbonyl derivatives from the homologues of pyridin are allowed to act on guaïacol.

The process proceeds in an analogous manner if instead of guaïacol, other aromatic phenols, such as phenol, cresol, guaethol, creosol, or the like are employed. In all these cases the known carbonates of the respective phenols are produced. Mixtures of different phenols can likewise be used, for instance the mixture of guaïacol, creosol, cresol, &c., commercially known as "creosote." In order to illustrate the use of such mixtures the following example is given, the parts being by weight: To a mixture prepared from twenty-five parts of chlorocarbonyl pyridin and five hundred parts of pure benzene twenty-five parts of pure "creosote" (see *Pharmacopœa Germanica*, 3d edition) are added with stirring and carefully cooling. When the reaction is finished the mixture is washed first with a dilute hydrochloric acid, then with a dilute caustic soda-lye and finally with water. Subsequently the benzene is distilled off by means of steam. Thus a thick yellow oil is obtained which is the known creosote carbonate.

Having now described my invention and in what manner the same is to be performed, what I claim as new, and desire to secure by Letters Patent, is—

The process for the production of carbonates of aromatic phenols, which process consists in first acting with one of the chlorocarbonyl derivatives of the pyridin base series on aromatic phenols and secondly separating the so-formed carbonates from the reaction mixtures, substantially as hereinbefore described.

In testimony whereof I have signed my name in the presence of two subscribing witnesses.

FRITZ HOFMANN.

Witnesses:
R. E. JAHN,
OTTO KÖNIG.